(12) United States Patent
Hoshi et al.

(10) Patent No.: US 7,853,399 B2
(45) Date of Patent: Dec. 14, 2010

(54) INTERNAL COMBUSTION ENGINE CONTROL APPARATUS AND METHOD

(75) Inventors: Koichi Hoshi, Susono (JP); Makoto Tomimatsu, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 52 days.

(21) Appl. No.: 12/445,085

(22) PCT Filed: May 23, 2008

(86) PCT No.: PCT/IB2008/001293

§ 371 (c)(1),
(2), (4) Date: Apr. 10, 2009

(87) PCT Pub. No.: WO2008/142549

PCT Pub. Date: Nov. 27, 2008

(65) Prior Publication Data

US 2010/0071660 A1    Mar. 25, 2010

(30) Foreign Application Priority Data

May 23, 2007    (JP)    ............................. 2007-136327

(51) Int. Cl.
*F02M 7/28* (2006.01)
*F02D 41/16* (2006.01)

(52) U.S. Cl. .................... 701/105; 123/435; 123/90.15; 123/680; 123/347; 123/339.22

(58) Field of Classification Search ......... 701/103–105; 123/435, 299–300, 305, 347, 90.15, 339.22, 123/680, 443
See application file for complete search history.

(56) References Cited

U.S. PATENT DOCUMENTS

| | | | | |
|---|---|---|---|---|
| 6,240,724 B1 * | 6/2001 | Kudou et al. | ................... | 60/284 |
| 7,195,000 B2 * | 3/2007 | Kayama et al. | .............. | 123/432 |

FOREIGN PATENT DOCUMENTS

| | | |
|---|---|---|
| EP | 0 978 643 | 2/2000 |
| EP | 1 283 343 | 2/2003 |
| EP | 1 512 860 | 3/2005 |
| JP | 5 44586 | 2/1993 |
| JP | 2003 120348 | 4/2003 |
| JP | 2004 92639 | 3/2004 |
| JP | 2008-14194 | * 1/2008 |
| JP | 2008-291686 | * 12/2008 |

* cited by examiner

*Primary Examiner*—Hai H Huynh
(74) *Attorney, Agent, or Firm*—Oblon, Spivak, McClelland, Maier & Neustadt, L.L.P.

(57) ABSTRACT

An internal combustion engine control apparatus executes an exhaust-valve-early-closing valve timing control in which an exhaust valve is closed before the intake stroke top dead center. The fuel injection timing mode is normally set to an intake-stroke non-synchronized fuel injection mode. However, if the internal combustion engine is idling and the combustion gas temperature is relatively high, the fuel injection timing mode is switched from the intake-stroke non-synchronized fuel injection mode to an intake-stroke synchronized fuel injection mode.

9 Claims, 7 Drawing Sheets

BASE VALVE TIMING CONTROL

EXHAUST-VALVE-EARLY-CLOSING VALVE TIMING CONTROL

INTERNAL COMBUSTION ENGINE CONTROL APPARATUS AND METHOD

BACKGROUND OF THE INVENTION

1. Field of the Invention

The invention relates to an internal combustion engine control apparatus and an internal combustion engine control method. In particular, the invention relates to an apparatus and a method for controlling an internal combustion engine in which a valve timing control for early closing of exhaust valves is executed.

2. Description of the Related Art

Japanese Patent Application Publication No. 2004-92639 (JP-A-2004-92639) describes a valve tinting control apparatus for an internal combustion engine incorporating a variable valve timing mechanism capable of variably controlling the timing for opening and closing exhaust valves. This valve timing control apparatus controls, under a given operation condition, the exhaust valves to be closed before the intake stroke top dead center (this control will be referred to as "exhaust-valve-early-closing valve timing control" where necessary). According to this exhaust-valve-early-closing valve timing control, the gas remaining in each combustion chamber after failing to be discharged to the exhaust gas passage on the exhaust stroke (will be referred to as "residual gas" where necessary) can be subjected to combustion again. As such, unburned hydrocarbon contained in the residual gas is combusted again, and this reduces the exhaust emissions.

Meanwhile, when an internal combustion engine is idling after running at high load, the temperature in the engine compartment of the vehicle tends to be relatively high, and thus the temperature of the engine coolant tends to be relatively high. Further, during the foregoing exhaust-valve-early-closing valve timing control, the aforementioned high-temperature residual gas, which has been subjected to combustion on the power stroke and then recompression on the exhaust stroke, is brought back into the intake passage and then drawn again into the combustion chamber. Therefore, in an internal combustion engine in which the foregoing exhaust-valve-early-closing control is executed, if the internal combustion engine is placed in the idling state after running at high load, the temperature of combustion gas tends to be relatively high. If the internal combustion engine is reaccelerated in this state, engine knocking (will be referred to as "start engine knocking" where necessary) may occur.

SUMMARY OF THE INVENTION

The invention provides an internal combustion engine control apparatus and method that are applied to an internal combustion engine in which an exhaust-valve-early-closing valve timing control is executed. The internal combustion engine control apparatus and method of the invention are adapted to prevent engine knocking that may occur when the internal combustion engine is reaccelerated while it is idling after running at high load.

The first aspect of the invention relates to an internal combustion engine control apparatus having: a variable valve drive mechanism capable of changing at least the time point to close an exhaust valve; exhaust-valve-early-closing control executing means for executing an exhaust-valve-early-closing valve timing control in which the exhaust valve is closed before an intake stroke top dead center; fuel injection timing controlling means for switching a fuel injection timing mode between an intake-stroke non-synchronized fuel injection mode and an intake-stroke synchronized fuel injection mode; and combustion gas temperature estimating means for estimating the temperature of combustion gas in the internal combustion engine. The fuel injection timing controlling means normally executes the intake-stroke non-synchronized fuel injection mode during the exhaust-valve-early-closing valve timing control, and the fuel injection timing controlling means switches the fuel injection timing mode from the intake-stroke non-synchronized fuel injection mode to the intake-stroke synchronized fuel injection mode if the combustion gas temperature is estimated to be relatively high while the internal combustion engine is idling.

The internal combustion engine control apparatus described above may be such that the fuel injection timing controlling means performs the switching of the fuel injection timing mode from the intake-stroke non-synchronized fuel injection mode to the intake-stroke synchronized fuel injection mode on the condition that warming-up operation of the internal combustion engine has been completed.

Further, the internal combustion engine control apparatus described above may be such that the valve-open phase of the exhaust valve set in the exhaust-valve-early-closing valve timing control is 20° CA before the valve-open phase of the exhaust valve set in a base valve timing control.

Further, the internal combustion engine control apparatus described above may be such that if an operation record is indicating that the internal combustion engine was previously running at high load, the combustion gas temperature estimating means estimates that the present combustion gas temperature is relatively high.

Further, the internal combustion engine control apparatus described above may be such that if at least one of the speed of the internal combustion engine and the load rate of the internal combustion engine is equal to or higher than a threshold, the combustion gas temperature estimating means estimates that the internal combustion engine was previously running at high load.

Further, the internal combustion engine control apparatus described above may be such that if the outside temperature is equal to or higher than a predetermined value and the temperature of a coolant of the internal combustion engine is equal to or higher than a predetermined value and the internal combustion engine has been continuously idling for a predetermined time or longer, the combustion gas temperature estimating means estimates that the present combustion gas temperature is relatively high.

Further, the internal combustion engine control apparatus described above may be such that if the outside temperature is equal to or higher than a predetermined value and an air conditioner has been continuously running for a predetermined time or longer, the combustion gas temperature estimating means estimates that the present combustion gas temperature is relatively high.

Further, the internal combustion engine control apparatus described above may be applied to a port-injection type internal combustion engine.

The second aspect of the invention relates to a method for controlling an internal combustion engine, including: executing an exhaust-valve-early-closing valve timing control in which an exhaust valve is closed before an intake stroke top dead center; switching a fuel injection timing mode between an intake-stroke non-synchronized fuel injection mode and an intake-stroke synchronized fuel injection mode; determining whether the internal combustion engine is presently idling; and estimating the temperature of combustion gas in the internal combustion engine. In this method, if the combustion gas temperature is estimated to be relatively high while the internal combustion engine is idling, the fuel injection timing mode is switched from the intake-stroke non-synchronized fuel injection mode to the intake-stroke synchronized fuel injection mode.

According to the internal combustion engine control apparatus and method described above, in an internal combustion engine system in which exhaust-valve-early-closing valve timing control is executed to reduce exhaust missions (especially, hydrocarbon), the fuel injection timing mode is normally set to the intake-stroke non-synchronized fuel injection mode in order to facilitate fuel atomization, whereby a good fuel economy and a good exhaust gas emission performance can be both achieved. However, if the combustion gas temperature is estimated to be relatively high while the internal combustion engine is idling, the fuel injection timing mode is switched from the intake-stroke non-synchronized fuel injection mode to the intake-stroke synchronized fuel injection mode. In the intake-stroke synchronized fuel injection mode, the temperate of combustion gas is kept low owing to the vaporization heat of fuel drawn directly into the combustion chamber together with intake air. As such, even in a case where the internal combustion engine is reaccelerated when it is idling after running at high load, engine knocking can be reliably prevented.

According to the internal combustion engine control apparatus described above, further, because the combustion gas temperature is estimated to be relatively high if the operation record is indicating that the internal combustion engine was previously running at high load, operation states where the intake-stroke synchronized fuel injection mode needs to be executed to prevent the aforementioned engine knocking upon reacceleration can be more precisely detected.

According to the internal combustion engine control apparatus described above, further, because the combustion gas temperature is estimated to be relatively high if the outside temperature is equal to or higher than the predetermined value and the engine coolant temperature is equal to or higher than the predetermined value and the internal combustion engine has been continuously idling for the predetermined time or longer, operation states where the intake-stroke synchronized fuel injection mode needs to be executed to prevent the aforementioned engine knocking upon reacceleration can be more precisely detected According to the internal combustion engine control apparatus described above, further, because the combustion gas temperature is estimated to relatively high if the outside temperature is equal to or higher than the predetermined value and the air conditioner has been continuously running for the predetermined time or longer, operation states where the intake-stroke synchronized fuel injection mode needs to be executed to prevent the aforementioned engine knocking upon reacceleration can be more precisely detected.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF THE EMBODIMENTS

Figure 1:
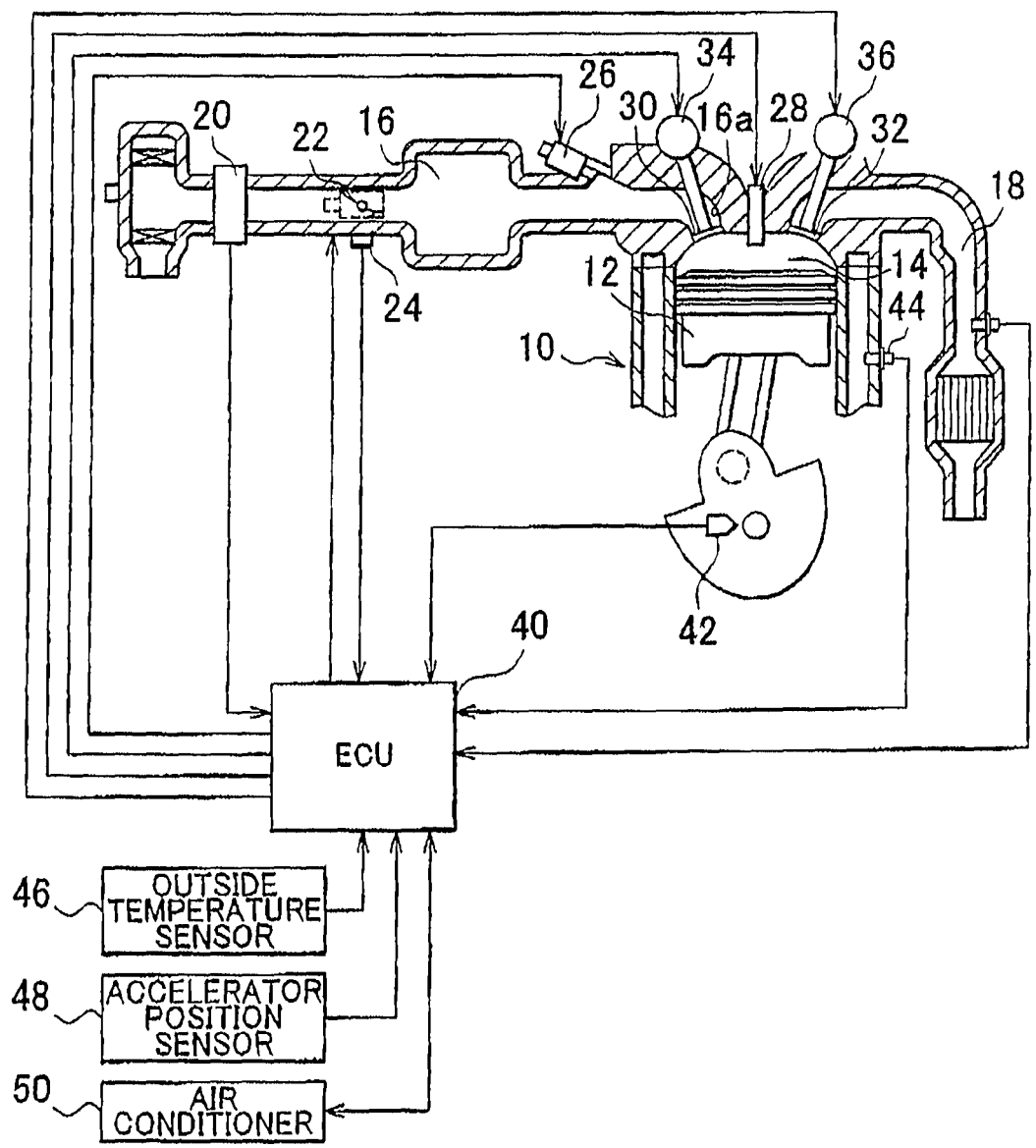
FIG. 1 is a view illustrating the configuration of an internal combustion engine control apparatus according to the first example embodiment of the invention.

FIG. 1 illustrates the configuration of an internal combustion engine control apparatus according to the first example embodiment of the invention. The internal combustion engine control apparatus of the first example embodiment is applied to a port-injection type internal combustion engine 10. Pistons 12 are provided in the respective engine cylinders formed in the internal combustion engine 10 such that they can reciprocate therein. In each engine cylinder, a combustion chamber 14 is formed above the top face of the piston 12. An intake passage 16 and an exhaust passage 18 communicate with the combustion chamber 14 of each engine cylinder.

An airflow meter 20 is provided immediately downstream of the inlet of the intake passage 16. The airflow meter 20 outputs signals indicative of the flow rate of air drawn into the intake passage 16. A throttle valve 22 is provided downstream of the airflow meter 20. The throttle valve 22 is an electronically-controlled throttle valve capable of changing its opening degree independent of the operation amount of the accelerator pedal. A throttle position sensor 24 is provided near the throttle valve 22. The throttle position sensor 24 detects a throttle opening degree TA.

Fuel injection valves 26 are provided downstream of the throttle valve 22. Each fuel injection valve 26 is used to inject fuel into each intake port 16a of the internal combustion engine 10. In the cylinder head of the internal combustion engine 10, ignition plugs 28 are provided for the respective engine cylinders. Each ignition plug 28 protrudes into the combustion chamber 14 from the upper face of the combustion chamber 14. An intake valve 30 is provided in each intake port 16a and is operable to allow and interrupt communication between the combustion chamber 14 and the intake passage 16. On the other hand, an exhaust valve 32 is provided in each exhaust port and is operable to allow and interrupt communication between the combustion chamber 14 and the exhaust passage 18.

Each intake valve 30 is driven by a variable intake valve drive mechanism 34, and each exhaust valve 32 is driven by a variable exhaust valve drive mechanism 36. The variable intake valve drive mechanism 34 is a VVT mechanism that variably controls the operation timing of the intake valves 30 by changing the operation phase of each intake cam (not shown in the drawings) continuously through hydraulic actuation or electric actuation, Likewise, the variable exhaust valve drive mechanism 36 is a VVT mechanism that variably controls the operation timing of the exhaust valves 32 by changing the operation phase of each exhaust cam (not shown in the drawings) continuously through hydraulic actuation or electric actuation.

The internal combustion engine control apparatus shown in FIG. 1 is provided with an ECU (Electronic Control Unit) 40. The ECU 40 is connected to, as well as the above-described sensors, a crank angle sensor 42 for detecting the engine speed, an outside temperature sensor 46 for detecting the outside temperature, and an accelerator position sensor 48 for detecting the operation amount of the accelerator pedal. Further, the ECU 40 is adapted to detect the signals transmitted to turn on and off the compressor of an air-conditioner 50. The ECU 40 is connected to various actuators including the throttle valve 22, the fuel injection valves 26, the variable intake valve drive mechanism 34, and the variable exhaust valve drive mechanism 36. The ECU 40 controls the operation of the internal combustion engine 10 by controlling the respective actuators on corresponding control programs using the outputs of the respective sensors.

The ECU 40 is adapted to set the injection timing variably. More specifically, the ECU 40 is adapted to switch the fuel injection timing mode between an intake-stroke non-synchronized fuel injection mode and an intake-stroke synchronized fuel injection mode. In the intake-stroke non-synchronized fuel injection mode, fuel is injected before the beginning of each intake stroke, that is, fuel is injected on each exhaust stroke. On the other hand, in the intake-stroke synchronized fuel injection mode, fuel is injected on each intake stroke. That is, in the intake-stroke synchronized fuel injection mode, fuel is injected in synchronization with the piston 12 moving downward while the intake valve 30 is open, so that the injected fuel is directly brought into the combustion chamber 14 together with intake air on the intake stroke.

Figure 2A:
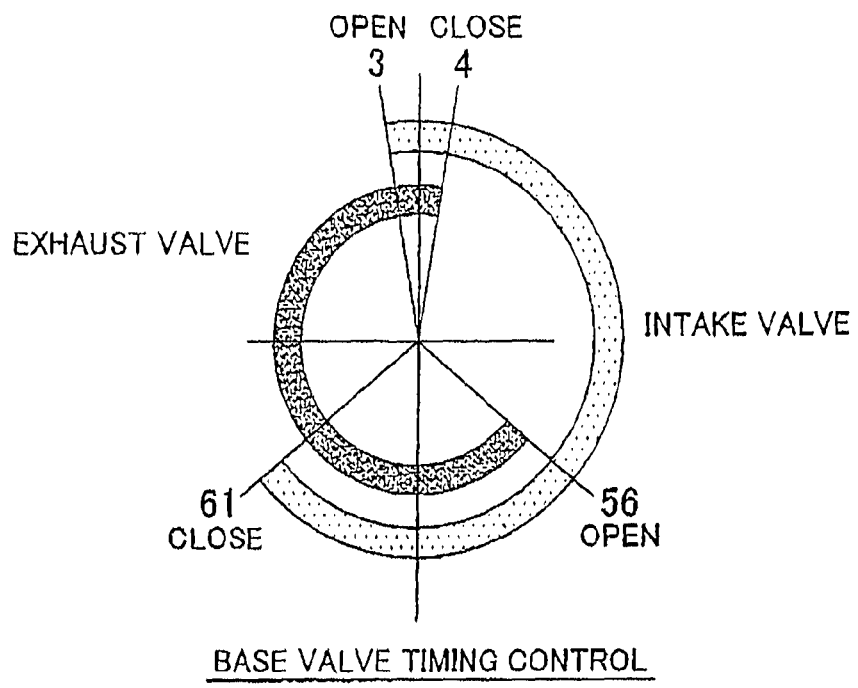
FIG. 2A is a chart illustrating the valve timing of a typical internal combustion engine.
Figure 2B:
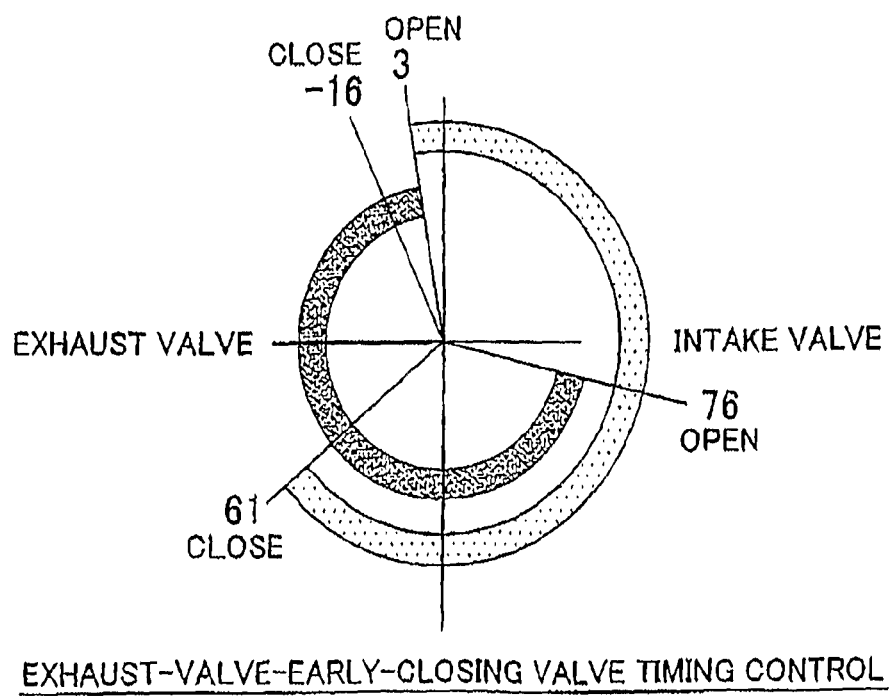
FIG. 2B is a chart illustrating the valve timing of the internal combustion engine incorporating the internal combustion engine control apparatus of the first example embodiment.

FIG. 2A illustrates the valve timing of a typical internal combustion engine, while FIG. 2B illustrates the valve timing of the internal combustion engine 10 incorporating the internal combustion engine control apparatus of the first example embodiment. The typical valve timing, illustrated in FIG. 2A will be referred to as "base valve timing control". In the base valve timing control illustrated in FIG. 2A, the intake valves 30 are opened at before the intake stroke top dead center (BTDC) 3° CA ("CA": Crank Angle) and then closed at after the intake stroke bottom dead center (ABDC) 61° CA, and the exhaust valves 32 are opened at before the expansion stroke bottom dead center (BBDC) 56° CA and then closed at after intake stroke top dead center (ATDC) 4° CA.

In the valve timing control of the first example embodiment illustrated in FIG. 2B, on the other hand, although the intake valves 30 are opened and closed at the same points as those set in the above-described base valve timing control, the exhaust valves 32 are opened and closed at points different from those set in the base valve timing control. More specifically, the valve-open phase of each exhaust valve 32 set in the valve timing control of the first example embodiment is 20° CA before that set in the base valve timing control. That is, in the valve timing control illustrated in FIG. 2B, each exhaust valve 32 is opened at before the expansion stroke bottom dead center (BBDC) 76° CA and then closed at before the intake stroke top dead center (BTDC) 16° CA. In the following, this valve timing control for advancing the operation points of each exhaust valve 32 will be referred to as "exhaust-valve-early-closing valve timing control".

Figure 3:
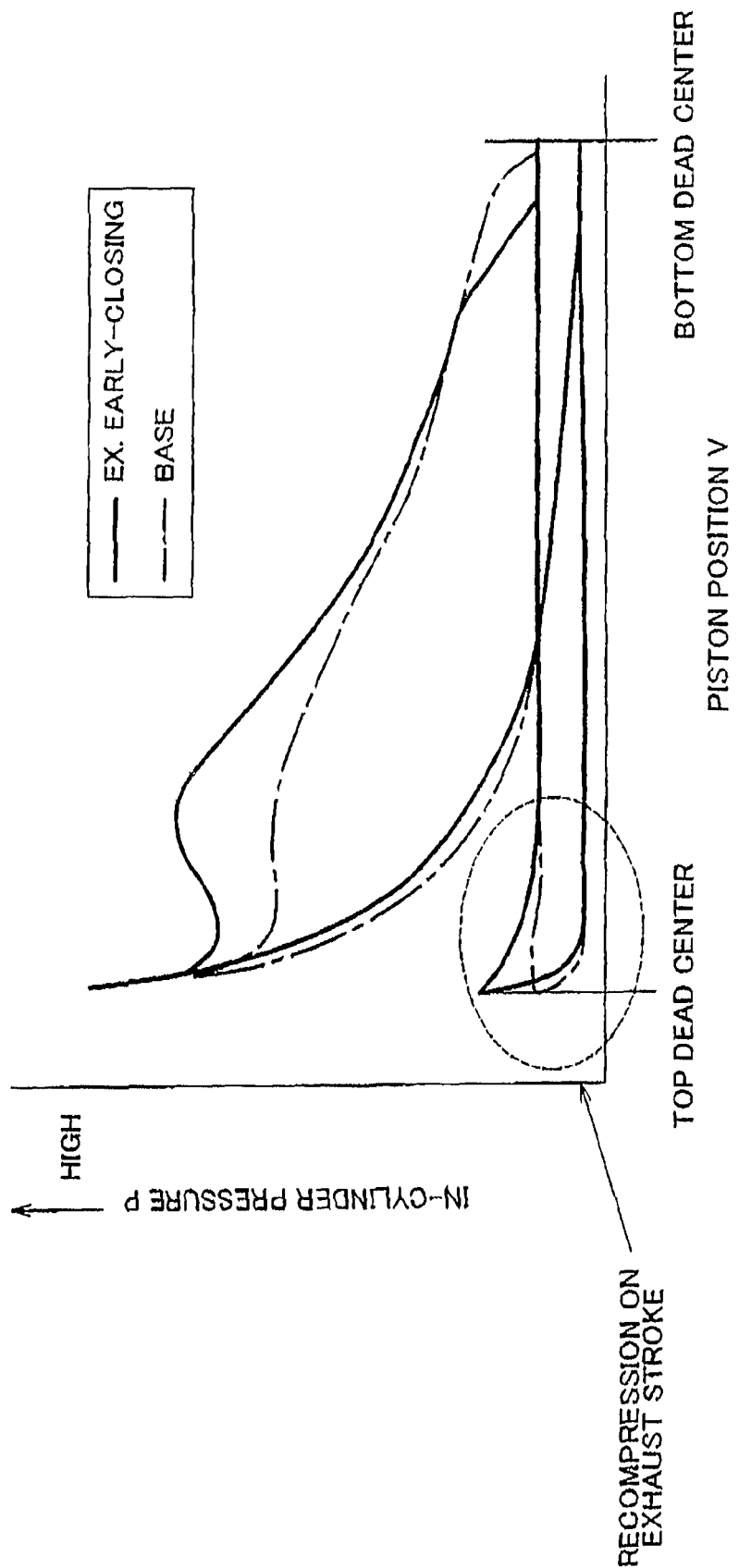
FIG. 3 is a graph illustrating in comparison how the in-cylinder pressure P varies in a state where the intake valve and the exhaust valve are operated according to the base valve timing control and in a state where the intake valve and the exhaust valve are operated according to the exhaust-valve-early-closing valve timing control.

FIG. 3 is a graph illustrating in comparison how the pressure P in the engine cylinder (will be referred to as "in-cylinder pressure P" where necessary) varies in a state where the intake valve 30 and the exhaust valve 32 are operated according to the base valve timing control and in a state where the intake valve 30 and the exhaust valve 32 are operated according to the exhaust-valve-early-closing valve timing control. In the graph of FIG. 3, the dotted curves represent how the in-cylinder pressure P varies when the intake valve 30 and the exhaust valve 32 are operated according to the base valve timing control, while the solid curves represent how the in-cylinder pressure P varies when the intake valve 30 and the exhaust valve 32 are operated according to the exhaust-valve-early-closing timing. During the exhaust-valve-early-closing valve timing control, the exhaust valve 32 is closed midway on the exhaust stroke, and the gas remaining in the combustion chamber 14 is recompressed until the piston 12 reaches the vicinity of the intake stroke top dead center. Therefore, during the exhaust-valve-early-closing valve timing control, the in-cylinder pressure P is boosted at the final stage of each exhaust stroke as indicated at the portion designated by the dotted circle in FIG. 3.

Figure 4:
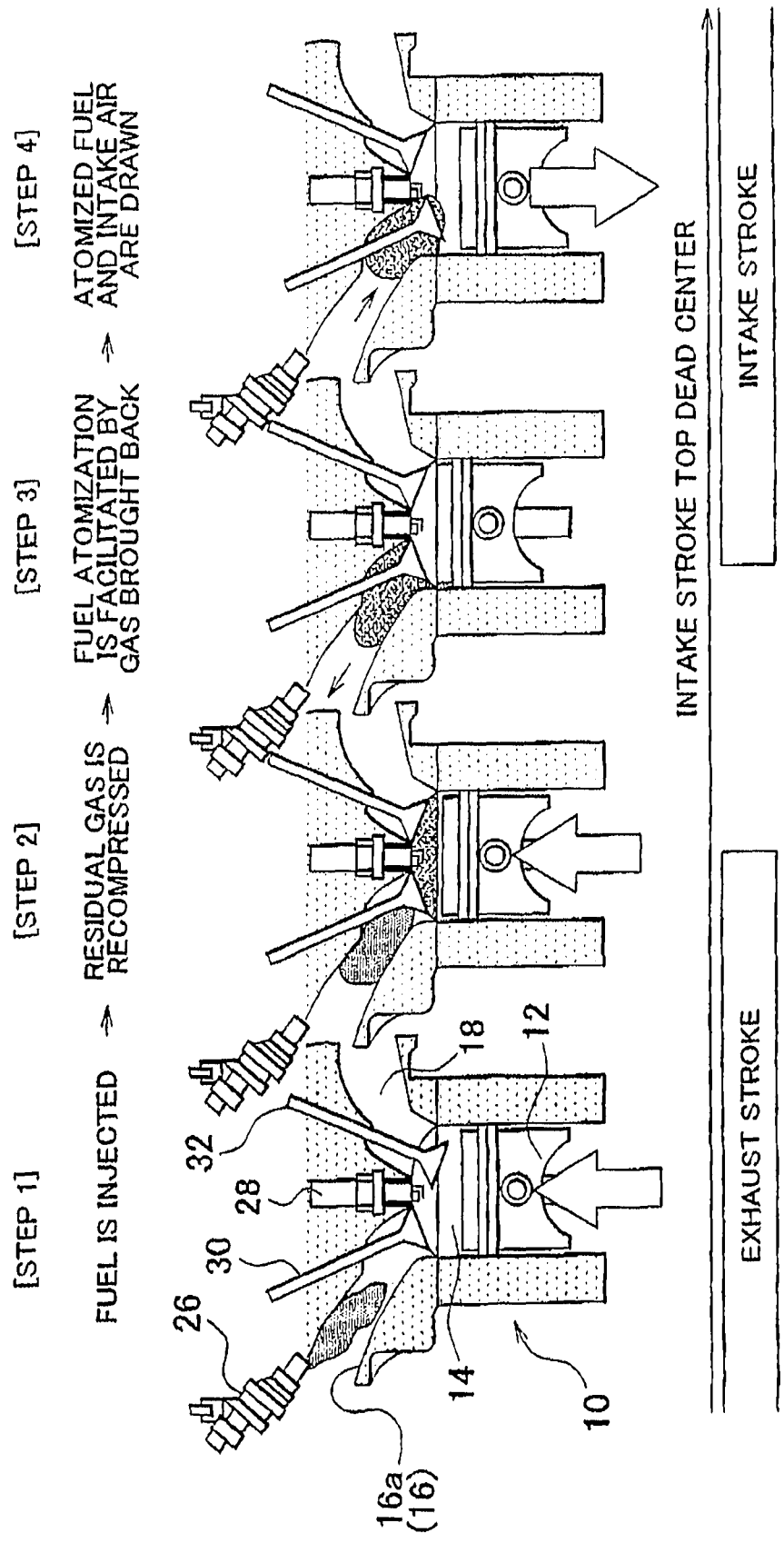
FIG. 4 is a view illustrating how the internal combustion engine operates when the exhaust-valve-early-closing valve timing control and the intake-stroke non-synchronized fuel injection mode are executed in combination.

FIG. 4 illustrates how the internal combustion engine 10 operates when the exhaust-valve-early-closing valve timing control and the intake-stroke non-synchronized fuel injection mode are executed in combination. First, fuel is injected on an exhaust stroke as indicated at STEP 1 in FIG. 4. Then, the exhaust valve 32 is closed at the point described above. During this time, the unburned hydrocarbon (HC) on the inner face of the combustion chamber 14 is swept off by the piston 12 moving upward. However, because the exhaust valve 32 has already been closed, the unburned hydrocarbon is not discharged to the exhaust passage 18. In the state of STEP 2, the injected fuel still remains in the intake port 16a while the residual gas in the combustion chamber 14 is being recompressed by the piston 12 moving upward.

Subsequently, the piston 12 reaches the intake stroke top dead center and then the intake valve 30 is opened. At this time, as indicated at STEP 3 in FIG. 4, the residual gas in the combustion chamber 14, which is a high-temperature and high-pressure gas, is brought back into the intake port 16a. This high-temperature gas flow reduces the fuel attaching on the inner face of the intake port 16a and facilitates the atomization of the fuel injected into the intake port 16a.

Then, as indicated at STEP 4 in FIG. 4, the atomized fuel is drawn into the combustion chamber 14 together with intake air (newly introduced air) as the piston 12 moves downward. Through these processes, the fuel is mixed well with air and then combusted in the combustion chamber 14. In this manner, proper combustion can be achieved. As a result, the torque of the internal combustion engine 10 increases, and therefore the amount of fuel required to maintain the engine speed Ne at a given idling speed during the idling of the internal combustion engine 10 decreases accordingly, which improves the fuel economy. Further, in the above-described combustion processes, because unburned hydrocarbon can be subjected to combustion in a good combustion state, the exhaust emissions decrease accordingly.

As described above, the combination of the exhaust-valve-early-closing valve timing control and the intake-stroke non-synchronized fuel injection mode facilitates fuel atomization and thus provides a good fuel economy and a good exhaust emission performance. In view of this, in the internal combustion engine control apparatus of the first example embodiment, the exhaust-valve-early-closing valve timing control and the intake-stroke non-synchronized fuel injection mode are implemented in combination as a normal operation mode.

Meanwhile, when the internal combustion engine 10 is idling after running at high load, the temperature in the engine compartment of the vehicle tends to be relatively high, and thus the temperature of the engine coolant tends to be relatively high. Further, if the foregoing exhaust-valve-early-closing valve timing control is executed, high-temperature residual gas, which has been subjected to combustion on the power stroke and then recompression on the exhaust stroke, is brought back into the intake port 16*a* and then drawn back into the combustion chamber 14. Therefore, if the internal combustion engine 10 is placed in the idling state after running at high load, the temperature of combustion gas tends to be relatively high. If the internal combustion engine 10 is accelerated in this state, engine knocking ("start engine knocking") may occur.

For the purpose of preventing such start engine hocking, in the internal combustion engine control apparatus of the first example embodiment, when the internal combustion engine 10 is idling under the exhaust-valve-early-closing valve timing control after being warmed up, if the operation record is indicating that the internal combustion engine 10 was previously running at high load, the fuel injection timing mode is switched from the intake-stroke non-synchronized fuel injection mode to the intake-stroke synchronized fuel injection mode.

Figure 5:
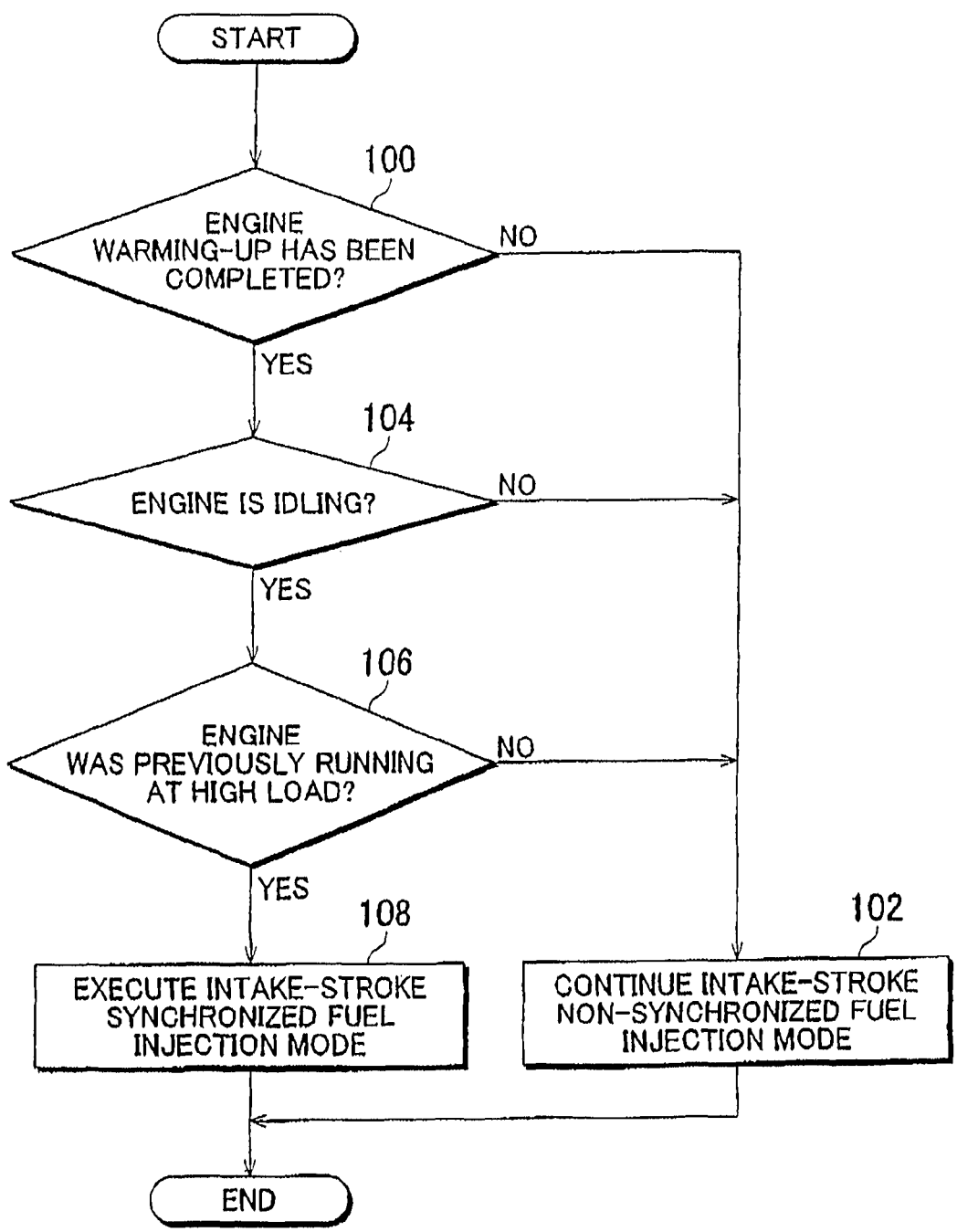
FIG. 5 is a flowchart illustrating the control routine executed in the internal combustion engine control apparatus of the first example embodiment of the invention.

To implement this, the ECU 40 executes the control routine illustrated by the flowchart of FIG. 5. After the start of this control routine, the ECU 40 first determines whether the warming-up of the internal combustion engine 10 has already been completed (step 100). This determination is made based on the temperature of the engine coolant, etc. If it is determined in step 100 that the warming-up of the internal combustion engine 10 has not yet been completed, the ECU 40 continues the intake-stroke non-synchronized fuel injection mode, giving a priority to facilitating fuel atomization (step 102).

On the other hand, if it is determined in step 100 that the warming-up of the internal combustion engine 10 has already been completed, the ECU 40 then determines whether the internal combustion engine 10 is presently idling (step 104). This determination is made based on information regarding the opening degree of the throttle valve, etc. If it is determined in step 104 that the internal combustion engine 10 is not presently idling, the ECU 40 continues the intake-stroke non-synchronized fuel injection mode, giving a priority to facilitating fuel atomization (step 102).

On the other hand, it is determined in step 104 that the internal combustion engine 10 is presently idling, the ECU 40 then determines whether the operation record is indicating that the internal combustion engine 10 was previously running at high load (step 106). More specifically, at this time, whether the internal combustion engine 10 was previously running at high load is determined based on, for example, whether the engine speed Ne was equal to or higher than a given threshold and/or whether a load rate KL was equal to or higher than a given threshold. If it is determined in step 106 that the operation record is not indicating that the internal combustion engine was previously running at high load, the ECU 40 continues the intake-stroke non-synchronized fuel injection mode, giving a priority to facilitating fuel atomization (step 102).

On the other hand, if it is determined in step 106 that the operation record is indicating that the internal combustion engine was previously running at high load, the present combustion gas temperature can be presumed to be relatively high. In this case, therefore, the ECU 40 switches the fuel injection timing mode from the intake-stroke non-synchronized fuel injection mode to the intake-stroke synchronized fuel injection mode (step 108).

According to the control routine described above, in the internal combustion engine 10 that executes the exhaust-valve-early-closing valve timing control in order to reduce the exhaust emissions (especially, hydrocarbon), the fuel injection timing mode is normally set to the intake-stroke non-synchronized fuel injection mode in order to facilitate fuel atomization and thereby improve the fuel economy and the exhaust gas emission performance. However, the fuel injection timing mode is switched from the intake-stroke non-synchronized fuel injection mode to the intake-stroke synchronized fuel injection mode if the following conditions are all satisfied: the warming-up of the internal combustion engine 10 has already been completed; the operation record is indicating that the internal combustion engine 10 was previously running at high load; and the internal combustion engine 10 is presently idling.

When the intake-stroke synchronized fuel injection mode is thus executed under the exhaust-valve-early-closing valve timing control, low-temperature fuel is directly drawn into the combustion chamber 14 together with intake air, and then the fuel is vaporized in the combustion chamber 14. In the intake-stroke synchronized fuel injection mode, the temperate of combustion gas is kept low owing to the vaporization heat of fuel drawn directly into the combustion chamber together with intake air. As such, even in a case where the internal combustion engine 10 is reaccelerated when it is idling after running at high load, engine knocking can be reliably prevented by changing the fuel injection timing as described above.

Further, because the exhaust-valve-early-closing valve timing control and the intake-stroke synchronized fuel injection mode are executed in combination, even in the intake-stroke synchronized fuel injection mode, the aforementioned high-temperature residual gas is drawn again into the combustion chamber 14 and then mixed with fuel, whereby the fuel is atomized sufficiently in the combustion chamber 14. Therefore, even when the fuel injection timing mode has been switched from the intake-stroke non-synchronized fuel injection mode to the intake-stroke synchronized fuel injection mode, sufficient fuel atomization can be achieved, and therefore start engine knocking can be prevented reliably.

In the internal combustion engine control apparatus of the first example embodiment of the invention, "exhaust-valve-early-closing control executing means" cited in the claims is provided by the ECU 40 controlling, using the variable exhaust valve drive mechanism 36, each exhaust valve 32 to be closed before the intake stroke top dead center, and "fuel injection timing controlling means" cited in the claims is provided by the ECU 40 executing the processes in the control routine illustrated in FIG. 5, and "combustion gas temperature estimating means" cited in the claims is provided by the ECU 40 executing the process in step 106.

Next, an internal combustion engine control apparatus according to the second example embodiment of the invention will be described with reference to FIG. 6. The configuration illustrated in FIG. 1 is used for the internal combustion engine control apparatus of the second example embodiment. In this internal combustion engine control apparatus, the ECU 40 is adapted to execute the control routine illustrated in FIG. 6 instead of that illustrated in FIG. 5, as will be described below.

In the internal combustion engine control apparatus of the first example embodiment, as described above, whether the combustion gas temperature is relatively high is estimated based on whether the operation record is indicating that the internal combustion engine 10 was previously running at high load. In the internal combustion engine control apparatus of the second example embodiment, on the other hand, the combustion gas temperature is estimated to be high if the following conditions are all satisfied: the outside temperature is equal to or higher than a reference outside temperature; the temperature of the engine coolant is equal to or higher than a reference engine coolant temperature; and the internal combustion engine 10 has been continuously idling for a predetermined time or longer (the length of "high-temperature engine operation period", which will be described later, has reached a predetermined value). If these conditions are all satisfied, the fuel injection timing mode is switched from the intake-stroke non-synchronized fuel injection mode to the intake-stroke synchronized fuel injection mode.

Figure 6:
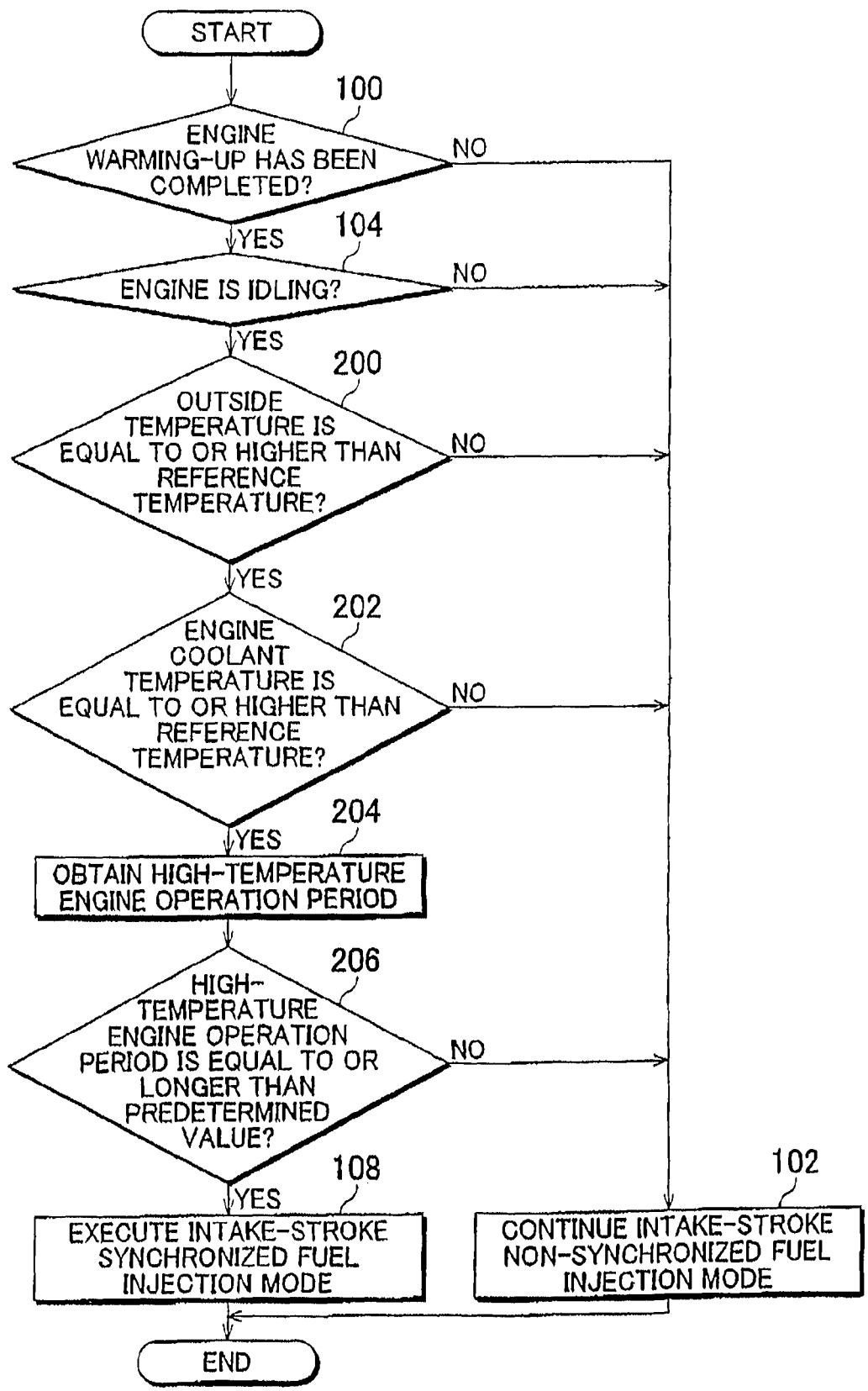
FIG. 6 is a flowchart illustrating the control routine executed in the internal combustion engine control apparatus of the second example embodiment of the invention.

To implement this, in the second example embodiment, the ECU 40 is adapted to execute the control routine, illustrated by the flowchart of FIG. 6. In FIG. 6, the processes identical to those of the control routine of the first example embodiment (FIG. 5) are denoted by the same step numbers and their descriptions are omitted or simplified. In the control routine of FIG. 6, after it is determined in step 104 that the internal combustion engine 10 is presently idling, the ECU 40 determines whether the outside temperature is equal to or higher than the reference outside temperature (step 200).

If it is determined in step 200 that the outside temperature is lower than the reference outside temperature, the ECU 40 continues the intake-stroke non-synchronized fuel injection mode (step 102). On the other hand, if it is determined in step 200 that the outside temperature is equal to or higher than the reference outside temperature, the ECU 40 then determines whether the temperature of the engine coolant is equal to or higher than the reference engine coolant temperature (step 202).

If it is determined in step 202 that the temperature of the engine coolant is lower than the reference engine coolant temperature, the ECU 40 continues the intake-stroke non-synchronized fuel injection (step 102). On the other hand, if it is determined in step 202 that the temperature of the engine coolant is equal to or higher than the reference engine coolant temperature, the ECU 40 then determines the time period that the internal combustion engine 10 has been continuously running at a high temperature (will be referred to as "high-temperature engine operation period") (step 204). More specifically, in a case where "YES" has been obtained in step 202, that is, in a case where the outside temperature is equal to or higher than the reference outside temperature and the temperature of the engine coolant is equal to or higher than the reference engine coolant temperature, the high-temperature engine operation period is determined as being equal to the time period that the internal combustion engine 10 has been idling.

Next, the ECU 40 determines whether the determined high-temperature engine operation period is equal to or longer than the predetermined value (step 206). As long as the high-temperature engine operation period is shorter than the predetermined value, the ECU 40 then continues the intake-stroke non-synchronized fuel injection mode (step 102). On the other hand, when the high-temperature engine operation period has reached the predetermined value, the ECU 40 switches the fuel injection timing mode from the intake-stroke non-synchronized fuel injection mode to the intake-stroke synchronized fuel injection mode (step 108).

According to the control routine described above, if the high-temperature engine operation period is equal to or longer than the predetermined value, the combustion gas temperature is determined (estimated) to be relatively high and therefore the intake-stroke synchronized fuel injection mode is executed. According to this control procedure, in the internal combustion engine 10 that executes the exhaust-valve-early-closing valve timing control, operation states where the intake-stroke synchronized fuel injection mode needs to be executed to prevent start engine knocking can be more precisely detected.

Next, an internal combustion engine control apparatus according to the third example embodiment of the invention will be described with reference to FIG. 7. The configuration illustrated in FIG. 1 is used for the internal combustion engine control apparatus of the third example embodiment. In this internal combustion engine control apparatus, the ECU 40 is adapted to execute the control routine illustrated in FIG. 7 instead of that illustrated in FIG. 5, as will be described below.

In the internal combustion engine control apparatus of the first example embodiment, whether the combustion gas temperature is relatively high is estimated based on whether the operation record is indicating that the internal combustion engine was previously running at high load. In the internal combustion engine control apparatus of the third example embodiment, on the other hand, the combustion gas temperature is estimated to be high if the outside temperature is equal to or higher than a reference outside temperature and the air-conditioner has been continuously running for a predetermined time period or longer. In the third example embodiment, if these conditions are both satisfied, the fuel injection timing mode is switched from the intake-stroke non-synchronized fuel injection mode to the intake-stroke synchronized fuel injection mode.

Figure 7:
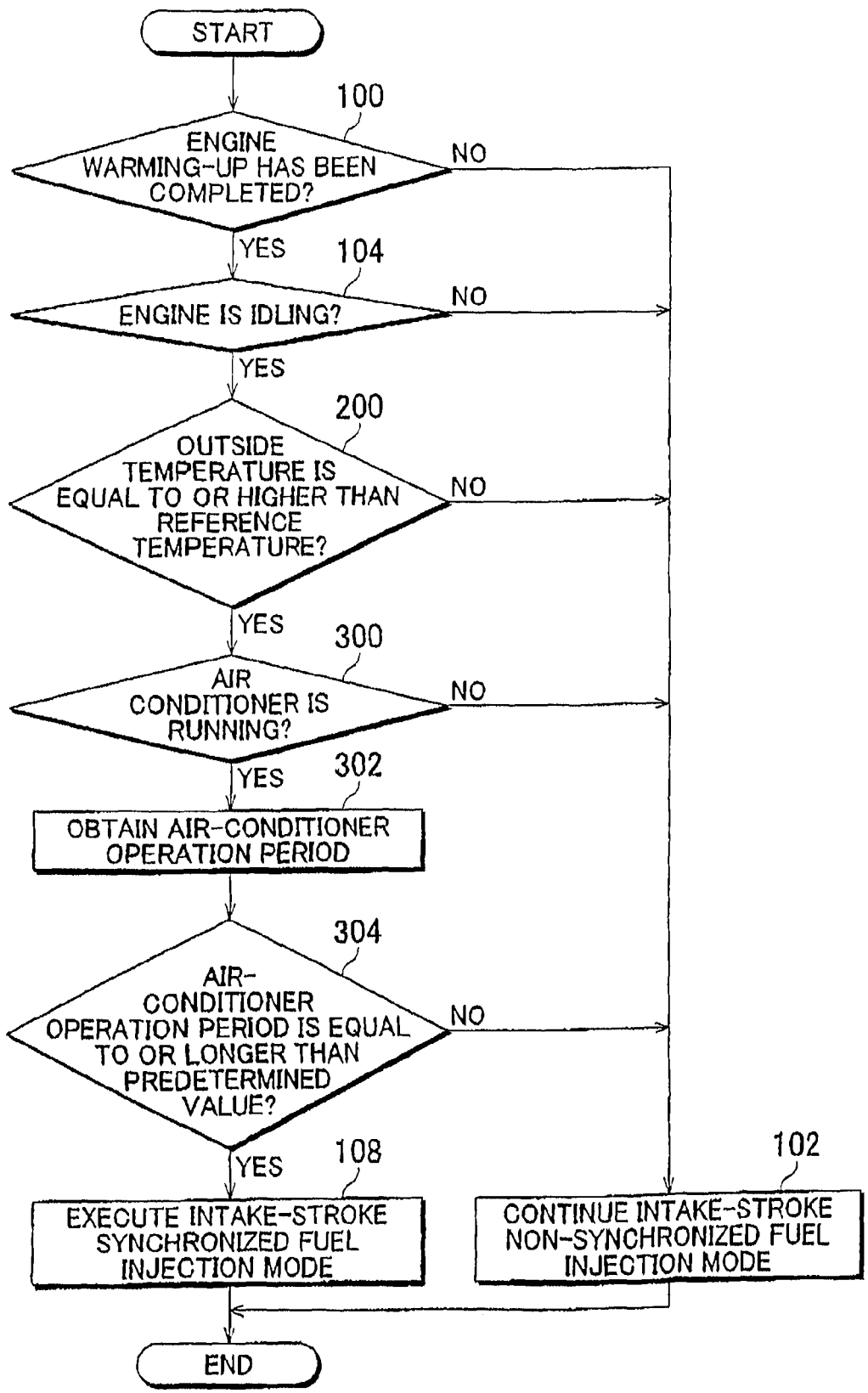
FIG. 7 is a flowchart illustrating the control routine executed in the internal combustion engine control apparatus of the third example embodiment of the invention.

To implement this, in the third example embodiment, the ECU 40 executes the control routine illustrated by the flowchart of FIG. 7. In FIG. 7, the processes identical to those of the control routine of the second example embodiment (FIG. 6) are denoted by the same step numbers and their descriptions are omitted or simplified. In the control routine of FIG. 7, after it is determined in step 200 that the outside temperature is equal or higher than the reference outside temperature, the ECU 40 then determines whether the compressor of the air-conditioner is presently running (step 300).

If it is determined in step 300 that the compressor of the air-conditioner is not presently running, the ECU 40 continues the intake-stroke non-synchronized fuel injection mode (step 102). On the other hand, if it is determined in step 300 that the compressor of the air-conditioner is presently running, the ECU 40 then obtains the time period that the compressor of the air-conditioner has been continuously running (will be referred to as "air-conditioner operation period") (step 302).

Subsequently, the ECU 40 determines whether the obtained air-conditioner continuous operation period is equal to or longer than a predetermined value (step 304). As long as the air-conditioner operation period is shorter than the predetermined value, the ECU 40 continues the intake-stroke non-synchronized fuel injection mode (step 102). On the other hand, when the air-conditioner operation period has reached the predetermined value, the ECU 40 switches the fuel injection timing mode from the intake-stroke non-synchronized fuel injection mode to the intake-stroke synchronized fuel injection mode (step 108).

According to the control routine described above, when the internal combustion engine 10 is idling, if the outside temperature is high and the air-conditioner operation period is equal to or longer than the predetermined value, the combustion gas temperature is determined (estimated) to be relatively high, and therefore the intake-stroke synchronized fuel injection is executed. According to this control procedure, in the internal combustion engine 10 operating under the exhaust-valve-early-closing valve timing control, operation states where the intake-stroke synchronized fuel injection mode needs to be executed to prevent start engine knocking can be more precisely detected.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. An internal combustion engine control apparatus, comprising:
    a variable valve drive mechanism capable of changing at least the time point to close an exhaust valve;
    an exhaust-valve-early-closing control executing section for executing an exhaust-valve-early-closing valve timing control in which the exhaust valve is closed before an intake stroke top dead center;
    a fuel injection timing controlling section for switching a fuel injection timing mode between an intake-stroke non-synchronized fuel injection mode and an intake-stroke synchronized fuel injection mode; and
    a combustion gas temperature estimating section for estimating the temperature of combustion gas in the internal combustion engine, wherein
    the fuel injection timing controlling section executes the intake-stroke non-synchronized fuel injection mode during the exhaust-valve-early-closing valve timing control, and
    the fuel injection timing controlling section switches the fuel injection timing mode from the intake-stroke non-synchronized fuel injection mode to the intake-stroke synchronized fuel injection mode if the combustion gas temperature is estimated to be relatively high while the internal combustion engine is idling.

2. The internal combustion engine control apparatus according to claim 1, wherein the fuel injection timing controlling section performs the switching of the fuel injection timing mode from the intake-stroke non-synchronized fuel injection mode to the intake-stroke synchronized fuel injection mode on the condition that warming-up operation of the internal combustion engine has been completed.

3. The internal combustion engine control apparatus according to claim 1, wherein the valve-open phase of the exhaust valve set in the exhaust-valve-early-closing valve timing control is 20° CA before the valve-open phase of the exhaust valve set in a base valve timing control.

4. The internal combustion engine control apparatus according to claim 1, wherein if an operation record is indicating that the internal combustion engine was previously running at high load, the combustion gas temperature estimating section estimates that the present combustion gas temperature is relatively high.

5. The internal combustion engine control apparatus according to claim 4, wherein if at least one of the speed of the internal combustion engine and the load rate of the internal combustion engine is equal to or higher than a threshold, the combustion gas temperature estimating section estimates that the internal combustion engine was previously running at high load.

6. The internal combustion engine control apparatus according to claim 1, wherein if the outside temperature is equal to or higher than a predetermined value and the temperature of a coolant of the internal combustion engine is equal to or higher than a predetermined value and the internal combustion engine has been idling for a predetermined time or longer, the combustion gas temperature estimating section estimates that the present combustion gas temperature is relatively high.

7. The internal combustion engine control apparatus according to claim 1, wherein if the outside temperature is equal to or higher than a predetermined value and an air conditioner has been continuously running for a predetermined time or longer, the combustion gas temperature estimating section estimates that the present combustion gas temperature is relatively high.

8. The internal combustion engine control apparatus according to claim 1, wherein the internal combustion engine is a port-injection type internal combustion engine.

9. A method for controlling an internal combustion engine, comprising:
    executing an exhaust-valve-early-closing valve timing control in which an exhaust valve is closed before an intake stroke top dead center;
    switching a fuel injection timing mode between an intake-stroke non-synchronized fuel injection mode and an intake-stroke synchronized fuel injection mode;
    determining whether the internal combustion engine is presently idling; and
    estimating the temperature of combustion gas in the internal combustion engine, wherein
    if the combustion gas temperature is estimated to be relatively high while the internal combustion engine is idling, the fuel injection timing mode is switched from the intake-stroke non-synchronized fuel injection mode to the intake-stroke synchronized fuel injection mode.

* * * * *